United States Patent [19]

Adachi et al.

[11] Patent Number: 5,780,543
[45] Date of Patent: Jul. 14, 1998

[54] METHOD FOR THE PREPARATION OF ONE-PACKAGE ROOM-TEMPERATURE-CURABLE SILICONE ELASTOMER COMPOSITIONS

[75] Inventors: Hiroshi Adachi; Toshio Saruyama, both of Chiba, Japan

[73] Assignee: Dow Corning Toray Silicone Co., Ltd., Tokyo, Japan

[21] Appl. No.: 622,790

[22] Filed: Mar. 27, 1996

[30] Foreign Application Priority Data

Mar. 31, 1995 [JP] Japan ................. 7-099501

[51] Int. Cl.$^6$ ............... C08L 83/08; C08L 83/06
[52] U.S. Cl. ............... 524/789; 524/588; 524/860; 524/866
[58] Field of Search ............... 524/863, 588, 524/860, 866, 789; 427/207.1

[56] References Cited

U.S. PATENT DOCUMENTS

| | | | |
|---|---|---|---|
| 4,419,484 | 12/1983 | Sattlegger et al. | 524/731 |
| 4,514,529 | 4/1985 | Beers et al. | 523/200 |
| 4,649,005 | 3/1987 | Kobayashi et al. | 264/101 |
| 5,013,781 | 5/1991 | Koshii et al. | 524/864 |
| 5,266,631 | 11/1993 | Arai et al. | 524/847 |

FOREIGN PATENT DOCUMENTS

| | | |
|---|---|---|
| 599616 | 6/1994 | European Pat. Off. |
| 41361 | 2/1990 | Japan |
| 53902 | 2/1992 | Japan |

*Primary Examiner*—Patricia A. Short
*Attorney, Agent, or Firm*—William F. Boley; Roger H. Borrousch

[57] ABSTRACT

One-package room-temperature-curable silicone elastomer compositions that do not slump prior to their cure, that provide a suitable processing or working time, that do not crack or fissure during their cure even when deformed by an external force, and that do not yellow during storage or after curing are prepared by mixing (A) the reaction mixture of
(a) hydroxyl-terminated diorganopolysiloxane and
(b) alkyl-containing oximosilane
or optionally (b) alone
with (B) the reaction mixture of
(a) hydroxy-terminated diorganopolysiloxane and
(c) vinyl-functional oximosilane
and by thereafter mixing in
(C) inorganic filler.

5 Claims, No Drawings

METHOD FOR THE PREPARATION OF ONE-PACKAGE ROOM-TEMPERATURE-CURABLE SILICONE ELASTOMER COMPOSITIONS

BACKGROUND OF THE INVENTION

1. Field of the Invention

This invention relates to a method for preparing one-package room-temperature-curable (hereinafter referred to as OP/RTC) silicone elastomer compositions. More specifically, this invention relates to a method for preparing OP/RTC silicone elastomer compositions that exhibit an excellent processability in that they do not slump prior to cure and provide a suitable processing or working time, that do not crack or fissure during their cure even when deformed by an external force, and that do not yellow during storage or after curing even when subjected to thermal episodes.

2. Background Information

Description of the Prior Art and Problems to Be Solved

OP/RTC silicone elastomer compositions are widely used as sealants, coatings, and adhesives in various sectors, such as the construction and civil engineering sectors, general manufacturing, and electronic and electrical sectors. In particular, the so-called oxime-eliminating room-temperature-curable silicone elastomer compositions, which produce a ketoxime by-product at the time of curing, have entered into broad use by virtue of their low corrosion of the contacted substrate and their excellent storage stability. The use of these OP/RTC silicone elastomer compositions involves their storage in a sealed container, such as a tube or cartridge; then, at the actual point of application, extrusion of the silicone elastomer composition as a paste; and thereafter finishing the surface to smoothness using, for example, a spatula. Thus, the surface of the composition must not cure for the particular period of time elapsing from extrusion into the atmosphere until finishing. Nor must the composition flow downward when filled into a vertical or downward-slanting position, i.e., it must be slump-free. Moreover, even when the surface has begun to cure, additional time is required for the curing region to develop adequate mechanical strength, and deformation of the composition by outside forces is problematic during the time interval extending from cure initiation at the surface until the development of mechanical strength. In specific terms, when subjected to a stretching or elongational deformation, the curing region will rupture due to its inadequate mechanical strength. This occurrence of rupture in one location can lead to fracture of the entire body after its cure due to stress concentration at the said rupture site.

The occurrence of rupture during the course of curing can be prevented by increasing the cure rate of subject silicone elastomer compositions, but simply increasing the cure rate functions to shorten the working time available for spatula finishing. The use of this approach is also associated with a ready tendency for the silicone elastomer composition to yellow during storage. The development is therefore desired of a OP/RTC silicone elastomer composition that will provide an acceptable working time but which will rapidly develop mechanical strength once curing has is started.

Japanese Patent Application Laid Open (Kokai or Unexamined) Number Hei 4-53902 (1992) proposes a composition in which the crosslinker consists in part of a compound having four oxime groups bonded to one silicon atom. This composition exhibits appropriate rates of surface cure and mechanical strength development. However, the tetraoximosilanes are associated with an explosion risk, etc., when the organic solvent used in their synthesis is removed, but avoiding this forces the production of a composition that contains organic solvent. Therefore, the use of trioximosilanes and the omission of tetraoximosilanes, as in the examples of the prior art provided below, is preferred for economic and safety reasons.

Sattlegger et al in U.S. Pat. No. 4,419,484, issued Dec. 6, 1983, equivalent to Japanese Patent Application Laid Open (Kokai or Unexamined) Number Sho 57-149355 (1982) provides by way of example a method for the preparation of compositions by admixing the filler after trioximosilane and hydroxyl- terminated diorganopolysiloxane have already been mixed. Japanese Patent Application Laid Open [Kokai or Unexamined] Number Hei 241361 [41,361/1990] discloses that this method can produce slumping-inhibited room-temperature-curable polyorganosiloxane compositions. This preparative method, however, suffers from a number of other problems. Thus, it yields compositions that are prone to exhibit an extremely rapid surface cure rate and that require a long period of time for the skinned film to develop mechanical strength.

Improvements to Japanese Number Hei 2-41361 are proposed by Arai et al in U.S. Pat. No. 5,266,631, issued Nov. 30, 1993 claiming priority for both Japanese Patent Application Laid Open (Kokai or Unexamined) Numbers Hei 4-366171(1992) and Hei 5-105813 (1993). Methods are proposed therein that provide slump inhibition, a suitably controlled surface cure rate, and a suitably adjusted time to mechanical strength development by the skinned film. This is achieved by using a moisture-depleted filler or by bringing the quantity of crosslinker added prior to filler addition into an appropriate range. However, these methods still do not yield an acceptable problem resolution. Thus, when the yellowing-resistant and economically advantageous methyltrioximosilanes are used as crosslinker, as shown later in the working examples the time to mechanical strength development by the skinned film becomes too long and surface cracking cannot be prevented under difficult curing conditions. As described in the working examples of these proposals, these drawbacks can be solved by changing the crosslinker over to the highly active vinyltrioximosilanes or by their combined use with the methyltrioximosilanes. However, large amounts of vinyltrioximosilane must be used in order to prevent surface cracking, which in turn causes new problems, for example, the composition now has a pronounced tendency to yellow during storage and is uneconomical.

Like Sattlegger et al '484, Dziark et al in European Patent Application Publication No. 0599616, published Jun. 1, 1994 and equivalent to Japanese Patent Application Laid Open (Kokai or Unexamined) Number Hei 6-234148 (1994) proposes a method in which the filler is admixed after the crosslinker has been mixed with hydroxyl-terminated diorganopolysiloxane, but the latter method then continues with the addition of a nonreactive diorganopolysiloxane. This method solves two problems in that it inhibits slump and improves the extrudability. However, it cannot solve the problem of inhibiting surface cracking while maintaining a suitable working time. Moreover, in order to avoid post-cure bleed and a reduction in adherence, the amount of nonreactive diorganopoly-siloxane added after the filler cannot be too large, but this restriction diminishes the flexibility to adjust the various properties.

SUMMARY OF THE INVENTION

Problems to Be Solved by the Invention

The inventors achieved the present invention as the result of extensive investigations directed to solving the problems described above.

The object of the present invention is to provide a method for the preparation of OP/RTC silicone elastomer compositions that do not slump prior to their cure, that provide a suitable processing or working time, that do not crack or fissure during their cure even when deformed by an external force, and that do not yellow during storage or after curing even when subjected to thermal episodes.

Means Solving the Problems and Function Thereof

The present invention relates to a method for the preparation of room-temperature-curable silicone elastomer compositions comprising mixing (A) 0.5 to 75 parts by weight of the reaction mixture of (a) and (b) or composition (b) prepared from (a) 0 to 55 parts by weight hydroxyl-terminated diorganopolysiloxane with a viscosity at 25° C. of 0.5 to 300 Pa.s and (b) an alkyl-containing oximosilane with the formula $R^1Si(OX)_3$ in which $R^1$ represents an alkyl group and X is an organic group of the formula $-N=CR^2R^3$ in which each $R^2$ and $R^3$ represents a monovalent hydrocarbon groups having no more than 6 carbon atoms; an organic group of the formula

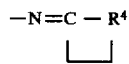

in which $R^4$ represents a divalent hydrocarbon group having no more than 10 carbon atoms; or a $C_1$ to $C_4$ monovalent hydrocarbon group, wherein $C_1$ to $C_4$ monovalent hydrocarbon groups make up no more than 30 mole % of X, wherein the amount of the said component (b) is within the range of 0.5 to 20 parts by weight for each 100 parts by weight of the total weight of component (a) in components (A) and (B) and the total number of moles of oximo groups in component (b) exceeds the total number of moles of hydroxyl groups in component (a) with (B) 45.5 to 120 arts by weight of the reaction mixture of (a) 45 to 100 parts by weight hydroxyl-terminated diorganopolysiloxane with a viscosity at 25° C. of 0.5 to 300 Pa.s, with the proviso that the total amount of component (a) used in components (A) and (B) is 100 parts by weight and (c) vinyl-functional oximosilane with the formula $CH_2=CHSi(OX)_3$ in which X is defined above, wherein the amount of said component (c) is within the range of 0.5 to 20 parts by weight for each 100 parts by weight of the total weight of component (a) in components (A) and (B) and the total number of moles of oximo groups in this component exceeds the total number of moles of hydroxyl groups in component (a); and by thereafter blending in (C) 1 to 200 parts by weight inorganic filler.

DETAILED DESCRIPTION OF THE PREFERRED EMBODIMENTS

The diorganopolysiloxane (a) in component (A) is hydroxyl-terminated diorganopolysiloxane. Its pendant organic groups consist of substituted and unsubstituted monovalent hydrocarbon groups, which are specifically exemplified by alkyl groups such as methyl, ethyl, and so forth; aryl groups such as phenyl and so forth; haloalkyl groups such as trifluoropropyl and so forth; and alkenyl groups such as vinyl, allyl, and so forth. The viscosity of this diorganopolysiloxane must be in the range of 0.5 to 300 Pa.s at 25° C. Viscosities below 0.5 Pa.s cause a reduced post-cure mechanical strength, while viscosities in excess of 300 Pa.s cause the silicone elastomer composition to exhibit an extremely reduced pre-cure workability. The subject diorganopolysiloxane is in fact well known as a starting material for room-temperature-curable silicone elastomer compositions. As long as at least 50 mole % of the molecular chain terminals of this diorganopolysiloxane carry the hydroxyl group, the remainder may be endblocked by inert groups such as trimethylsiloxy and the like.

Component (b), which functions as a crosslinker, is an alkyl-containing oximosilane with the formula $R^1Si(OX)_3$ in which $R^1$ is a $C_1$ to $C_4$ alkyl group such as methyl, ethyl, or propyl, and X is an organic group of the formula $-N=CR^2R^3$ in which each $R^2$ and $R^3$ represents a monovalent hydrocarbon group having no more than 6 carbon atoms, e.g., methyl, ethyl, propyl, etc.; an organic group of the formula

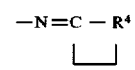

in which $R^4$ represents a divalent hydrocarbon group having no more than 10 carbon atoms, e.g., methylene, ethylene, propylene, etc.; or a $C_1$ to $C_4$ monovalent hydrocarbon group wherein $C_1$ to $C_4$ monovalent hydrocarbon groups make up no more than 30 mole % of X. Typical examples of the oximosilanes of component (b) are methyltri(methyl ethyl ketoximo)silane and ethyltri(methyl ethyl ketoximo) silane. The present invention may use only a single oximosilane selection or a mixture of two or more oximosilane selections defined by $R^1Si(OX)_3$. The amount of component (b) is within the range of 0.5 to 20 parts by weight for each 100 parts by weight of the total weight of the component (a) used in components (A) and (B), and, moreover, the total number of moles of oximo group present in component (b) should exceed the total number of moles of hydroxyl group present in component (a). When the number of moles of oximo group present in component (b) is less than the number of moles of hydroxyl group present in component (a), problems will occur such as one or more of the following problems gelation during the production of the component (a) and component (b) reaction mixture or the viscosity increases prior to the ensuing steps. Component (A) can be obtained simply by stirring components (a) and (b) together either at ambient temperature or with heating. The reaction between components (a) and (b) can be analyzed by techniques such as nuclear magnetic resonance spectroscopic analysis and so forth.

The component (A) used in the present invention includes the case in which use of component (a) is omitted, in which case component (A) consists only of component (b) and is not a reaction mixture of components (a) and (b).

The diorganopolysiloxane of (a) of the reaction mixture in (B) is the same as that described above for component (A).

Component (c), which also functions as a crosslinker, is a vinyl-functional oximosilane with the formula $CH_2=CHSi(OX)_3$ in which X is defined above. A typical example of this oximosilane is vinyltri(methyl ethyl ketoximo)silane. The amount of component (c) is within the range of 0.5 to 20 parts by weight for each 100 parts by weight of the total weight of the component (a) used in components (A) and (B), and, moreover, the total number of moles of oximo group present in component (c) should exceed the total number of moles of hydroxyl group present in component (a). When the number of moles of oximo group present in component (c) is less than the number of moles of hydroxyl group present in component (a) within the range of 0.5 to 20 parts by weight for each 100 parts by weight of the total weight of the component (a) in components (A) and (B), problems will occur such as one or more of the following problems, gelation during the production of the component (a) and component (c) reaction mixture or viscosity increases prior to the ensuing steps. Component (B) can be obtained simply by stirring components (a) and (c) together either at ambient temperature or with heating. This mixing is preferably carried out under an inert gas such as nitrogen. The reaction between components (a) and (c) can be analyzed by techniques such as nuclear magnetic resonance spectroscopic analysis and so forth.

The components (b) and (c) of the composition according to the present invention react not only with the hydroxyl groups (silanol groups) present in component (a), but also with the adsorbed water and surface silanol present in component (c) and with moisture infiltrating during composition storage. When these reactions occur and there is also no excess of components (b) and (c), problems will occur with the composition prepared by the method according to the present invention such as curing or gel production within the storage container and difficult extrusion due to an increased viscosity.

Components (A) and (B) are prepared as described above and are mixed in an ensuing step in the present invention. The mixing ratio for components (A) and (B) is 45.5 to 120 parts by weight component (B) per 0.5 to 75 parts by weight component (A). This mixing is a simple mixing that is unaccompanied by chemical reactions. However, since components (b) and (c) involved here are readily hydrolyzed by moisture, this mixing should be done in at atmosphere of an inert gas, such as nitrogen, or more preferably is carried out using a sealed mixing device.

The present invention proceeds first with the mixing of the components (A) and (B) described above and thereafter are admixed with the inorganic filler, (C). The inorganic filler (C) used here functions to improve the mechanical strength properties of the composition afforded by the preparative method when it is a reinforcing filler. Component (C), when it is a reinforcing filler, it will ordinarily be a reinforcing silica micropowder, for example, a dry-process silica or wet-process silica. Other fillers, such as extending fillers, may be used here, for example, calcium carbonate. When reinforcing silica micropowder is used, the desirable silica has a specific surface of 50 to 400 $m^2/g$ by the BET method. Moisture adsorbs quite readily to the surface of such silica micropowders, and when mixed into the composition this moisture can cause a loss of performance by the composition resulting from this method by reacting with components (b) and (c). The adsorbed moisture is therefore desirably minimized as much as possible prior to admixture. Subject silica micropowder may be directly used without additional processing, but may also be used after its surface has been subjected to a hydrophobicizing treatment. Hydrophobicized silica is exemplified by hexamethyldisilazane-treated silica, dimethyldichlorosilane-treated silica, dimethyldimethoxysilane-treated silica, methyltrimethoxysilane-treated silica, and so forth. Reinforcing silica micropowders are used in amounts of from 1 to 50 parts by weight per 100 parts by weight of (a), preferably from 5 to 25 parts by weight per 100 parts by weight of (a). Extending fillers can be used in amounts of from 1 to 200 parts by weight per 100 parts by weight of (a). Component (C) must be added at the rate of 1 to 200 parts by weight per 100 parts by weight total component (a) in components (A) and (B). Adequate reinforcement of the cured silicone elastomer is not obtained at an addition below 1 part by weight, while additions in excess of 200 parts by weight cause a loss of elasticity in the cured product and make it difficult to extrude the composition from its container.

The characteristic features of the present invention reside in the procedure and proportions for intermixing the components (A) to (C) described above. The goal here is to induce the appearance of the effects of the vinyl-functional trioximosilane (c) at the lowest possible concentration. Component (c) is essential for shortening the time to the appearance of mechanical strength by skinned sections (the shortening effect), but at the same time is very prone to cause yellowing. More particularly, the goal here is to induce a selective bonding of the vinyl-functional oximosilane with the silanol groups at the terminals of the base polymer. This is based on the knowledge, gained during the course of the investigations that led to the present invention, that the shortening effect of vinyl-functional oximosilane appears when the vinyl-functional oximosilane is directly bonded to the hydroxyl at the polymer terminals.

The inorganic filler is admixed in a third step into the mixture thus prepared. There are no particular restrictions on the mixing technique used here, but it will be desirable to run this mixing under an atmosphere that excludes atmospheric moisture. Heating is not required; rather, it is recommended that means be implemented to prevent the increase in temperature during mixing caused by the generation of heat due to shear. The preparative method according to the present invention is completed by removing the air entrained with the inorganic filler by a degassing procedure during or after this mixing, thus yielding a OP/RTC silicone elastomer composition having the desired characteristics.

In addition to components (A) to (C), the addition of a curing catalyst, a component (D) is recommended in the method of the present invention for the purpose of accelerating the cure. Any catalytic compound heretofore known in the art may be used as component (D) insofar as the functions of the invention composition are not impaired. Component (D) is exemplified by tin catalysts such as the dialkyltin dicarboxylates, titanate esters such as tetrabutyl titanate, and amine catalysts such as tetramethylguanidine. While component (D) will ordinarily take the form of a single selection, combinations of two or more selections may also be used. This component, when added, must be added at the rate of 0.01 to 5 parts by weight per the 100 parts by weight total component (a) in components (A) and (B). Additions in excess of 5 parts by weight frequently bring out negative effects such as yellowing and a loss of water resistance and heat resistance. No effect is obtained for the addition of less than 0.01 parts by weight. The timing of component (D) addition is not crucial.

The following can be added on an optional basis to the compositions of the present invention: silanol-free diorganopolysiloxanes, silicone resins, fluidity adjusters, adhesion promoters, pigments, heat stabilizers, flame retardants, antimolds, organic solvents, and the like.

Compositions according to the present invention as described above are characterized by an excellent processability or workability, freedom from yellowing, and freedom from surface cracking during their cure even when deformed by an external force. In consequence thereof they are particularly useful as adhesives, coatings, sealants, and the like.

The present invention will be explained in greater detail in the following through working and comparative examples, in which the reported viscosity values were measured at 25° C. and Pa.s is an abbreviation for pascalseconds. Polymer A was 70 weight % dimethylpolysiloxane (viscosity 17 Pa.s) endblocked at both terminals by hydroxyl and 30 weight % dimethylpolysiloxane (viscosity=17 Pa.s) endblocked at one terminal by hydroxyl and at the other by trimethylsiloxy. Crosslinker V refers to vinyltri(methyl ethyl ketoximo)silane and Crosslinker M refers to methyltri (methyl ethyl ketoximo)silane. The properties of the one-package silicone compositions were evaluated using the following methods.

Tack-free-time

The tack-free time was measured as an index of the working time. The test method was based on JIS A 5758.

Surface cracking time

The surface cracking time was evaluated as an index of the tendency for the composition to crack during the course of its cure. The test method consisted of first applying the composition on an aluminum panel, curing for a prescribed period of time at 25° C., and then executing a 180° fold in the aluminum panel. The value measured was the time until there was no occurrence of cracking in the surface of the composition at this point while keeping the specimen folded. Surface cracking times of 120 minutes or less may be taken as indicative from a practical standpoint of a low probability of cracking, while times of 60 minutes or less are even more desirable.

Post-cure durometer

A sheet with a thickness of approximately 2 mm was fabricated and cured at 25° C. for 5 days. The durometer of this sheet was then measured in accordance with JIS K 6301.

Yellowing

After its preparation, the composition was filled into a ½-L plastic cartridge and held for 8 weeks in a 95% humidity/40° C. atmosphere. The cartridge was then cut open, and the color change in the composition was inspected.

EXAMPLE 1

Using a mixer, 99.8 g Crosslinker M was added under a nitrogen blanket to 600 g Polymer A and this was mixed for 30 minutes at room temperature to yield a Polymer A/Crosslinker M mixture. 15.5 g Crosslinker V was added under a nitrogen blanket to 600 g Polymer A with mixing at room temperature for 30 minutes followed by the addition of 467 g of the previously prepared Polymer A/Crosslinker M mixture while exercising care to avoid contact with moisture. After then mixing at room temperature under a nitrogen blanket for 30 minutes, 115 g dry- process silica (BET specific surface =200 m$^2$/g) that had been dried at 120° C. for 3 hours was added with thorough mixing under a nitrogen atmosphere. 8.6 g gamma-(2-aminoethyl) aminopropyl-trimethoxysilane as adhesion promoter and 2.5 g dibutyltin dilaurate as curing catalyst were then added with thorough mixing under nitrogen. The resulting OP/RTC silicone elastomer composition was slump free and had an excellent appearance. The results from the evaluation of this composition were as reported in Table 1.

$^{29}$Si-NMR measurements were also run on small samples (Polymer A/Crosslinker M mixture, Polymer A/Crosslinker V mixture, and Polymer A) taken during the course of production. With respect to the former two samples, the —SiMe$_2$OH present in Polymer A was not detected at all, while in its place —O— SiMe(OX)$_2$ and —OSiVi(OX)$_2$ were detested, respectively.

EXAMPLE 2

Using a mixer, 93.1 g Crosslinker M was added under a nitrogen blanket to 700 g Polymer A and this was mixed for 30 minutes at room temperature to yield a Polymer A/Crosslinker M mixture. 15.5 g Crosslinker V was added under a nitrogen blanket to 500 g Polymer A with mixing at room temperature for 30 minutes followed by the addition of 567 g of the previously prepared Polymer A/Crosslinker M mixture while exercising care to avoid contact with moisture. After then mixing at room temperature under a nitrogen blanket for 30 minutes, 115 g dry- process silica (BET specific surface =200 m$^2$/g) that had been dried at 120° C. for 3 hours was added with thorough mixing under a nitrogen atmosphere. 8.6 g gamma-(2-aminoethyl) aminopropyl-trimethoxysilane as adhesion promoter and 2.5 g dibutyltin dilaurate as curing catalyst were then added with thorough mixing under nitrogen. The resulting OP/RTC silicone elastomer composition was slump free and had an excellent appearance. The results from the evaluation of this composition were as reported in Table 1.

EXAMPLE 3

Using a mixer, 15.5 g Crosslinker V was added under a nitrogen blanket to 1,000 g Polymer A and this was mixed for 30 minutes at room temperature. 66.5 g Crosslinker M was thereafter added while exercising care to avoid contact with moisture. After then mixing at room temperature under a nitrogen blanket for 30 minutes, 115 g dry-process silica (BET specific surface=200 m$^2$/g) that had been dried at 120° C. for 3 hours was added with thorough mixing under a nitrogen atmosphere. 8.6 g gamma-(2-aminoethyl) aminopropyltrimethoxy- silane as adhesion promoter and 2.5 g dibutyltin dilaurate as curing catalyst were then added with thorough mixing under nitrogen. The resulting OP/RTC silicone elastomer composition was slump free and had an excellent appearance. The results from the evaluation of this composition were as reported in Table 1.

Comparative Example 1

Using a mixer, 99.8 g Crosslinker M was added under a nitrogen blanket to 1,050 g Polymer A and this was mixed for 30 minutes at room temperature to yield a Polymer A/Crosslinker M mixture. 15.5 g Crosslinker V was added under a nitrogen blanket to 300 g Polymer A with mixing at room temperature for 30 minutes followed by the addition of 767 g of the previously prepared Polymer A/Crosslinker M mixture while exercising care to avoid contact with moisture. After then mixing at room temperature under a nitrogen blanket for 30 minutes, 115 g dry- process silica (BET specific surface =200 m$^2$/g) that had been dried at 120° C. for 3 hours was added with thorough mixing under a nitrogen atmosphere. 8.6 g gamma-(2-aminoethyl) aminopropyl-trimethoxysilane as adhesion promoter and 2.5 g dibutyltin dilaurate as curing catalyst were then added with thorough mixing under nitrogen. The resulting OP/RTC silicone elastomer composition was slump free and had an excellent appearance. The results from the evaluation of this composition were as reported in Table 1.

Comparative Example 2

15.5 g Crosslinker V and 66.5 g Crosslinker M were simultaneously added under a nitrogen blanket to 1,000 g Polymer A and this was mixed for 30 minutes at room temperature. 115 g dry-process silica (BET specific surface= 200 m$^2$/g) that had been dried at 120° C. for 3 hours was added with thorough mixing under a nitrogen atmosphere. 8.6 g gamma-(2-aminoethyl)amino propyltrimethoxysilane as adhesion promoter and 2.5 g dibutyltin dilaurate as curing catalyst were then added with thorough mixing under nitrogen. The resulting OP/RTC silicone elastomer composition was slump free and had an excellent appearance. The results from the evaluation of this composition were as reported in Table 1.

Comparative Example 3

82.0 g Crosslinker V was added under a nitrogen blanket to 1.000 g Polymer A and this was mixed for 30 minutes at room temperature. 115 g dry-process silica (BET specific surface=200 m$^2$/g) that had been dried at 120° C. for 3 hours was added with thorough mixing under a nitrogen atmosphere. 8.6 g gamma-2-aminoethyl) aminopropyltrimethoxysilane as adhesion promoter and 2.5 g dibutyltin dilaurate as curing catalyst were then added with thorough mixing under nitrogen. The resulting OP/RTC silicone elastomer composition was slump free and had an excellent appearance. The results from the evaluation of this composition were as reported in Table 1. In Table 1 and following tables, CX=crosslinker.

TABLE 1

|  | Examples | | | Comparative Examples | | |
|---|---|---|---|---|---|---|
|  | 1 | 2 | 3 | 1 | 2 | 3 |
| Polymer weight ratio | | | | | | |
| (1) CX V + polymer | 60 | 50 | 100 | 30 | — | 100 |
| (2) CX M + polymer | 40 | 50 | 0 | 70 | — | 0 |
| Addition weight ratio | | | | | | |
| Crosslinker V | 20 | 20 | 20 | 20 | 20 | 100 |
| Crosslinker M | 80 | 80 | 80 | 80 | 80 | 0 |
| Slump, mm | none | none | none | none | none | none |
| Tack-free-time minutes | 5 | 5 | 5 | 6 | 5 | 5 |
| Surface cracking time, minutes | 50 | 80 | 25 | at least 240 | 200 | 25 |
| Durometer | 27 | 27 | 25 | 24 | 24 | 27 |
| Yellowing | no | no | no | no | no | major |

EXAMPLE 4

Using a mixer, 75.3 g Crosslinker M was added under a nitrogen blanket to 450 g Polymer A and this was mixed for 30 minutes at room temperature to yield a Polymer A/Crosslinker M mixture. 15.5 g Crosslinker V was added under a nitrogen blanket to 700 g Polymer A with mixing at room temperature for 30 minutes followed by the addition of 350 g of the previously prepared Polymer A/Crosslinker M mixture while exercising care to avoid contact with moisture. After then mixing at room temperature under a nitrogen blanket for 30 minutes, 115 g hydrophobic silica (BET specific surface 130 m$^2$/g, prepared by treating the surface of dry-process silica with dimethyldichlorosilane) was added with thorough mixing under a nitrogen atmosphere. 8.6 g gamma-(2-aminoethyl)aminopropyltrimethoxy- silane as adhesion promoter and 1.0 g dibutyltin dilaurate as curing catalyst were then added with thorough mixing under nitrogen. The resulting OP/RTC silicone elastomer composition was slump free and had an excellent appearance. The results from the evaluation of this composition were as reported in Table 2.

Comparative Example A

Using a mixer, 69.5 g Crosslinker M was added under a nitrogen blanket to 900 g Polymer A and this was mixed for 30 minutes at room temperature to yield a Polymer A/Crosslinker M mixture. 15.5 g Crosslinker V was added under a nitrogen blanket to 350 g Polymer A with mixing at room temperature for 30 minutes followed by the addition of 350 g of the previously prepared Polymer A/Crosslinker M mixture while exercising care to avoid contact with moisture. After then mixing at room temperature under a nitrogen blanket for 30 minutes, 115 g hydrophobic silica (BET specific surface =130 m$^2$/g, prepared by treating the surface of dry-process silica with dimethyldichlorosilane) was added with thorough mixing under a nitrogen atmosphere. 8.6 g gamma-(2-aminoethyl)aminopropyltrimethoxy- silane as adhesion promoter and 1.0 g dibutyltin dilaurate as curing catalyst were then added with thorough mixing under nitrogen. The resulting OP/RTC silicone elastomer composition was slump free and had an excellent appearance. The results from the evaluation of this composition were as reported in Table 2.

TABLE 2

|  | Example 4 | Comparative Example 4 |
|---|---|---|
| Polymer weight ratio | | |
| (1) CX V + polymer | 70 | 35 |
| (2) CX M + polymer | 30 | 65 |
| Addition weight ratio | | |
| Crosslinker V | 23 | 23 |
| Crosslinker M | 77 | 77 |
| Slump, mm | none | none |
| Tack-free-time, min | 15 | 20 |
| Surface cracking time, min | 20 | 150 |
| Durometer | 26 | 26 |
| Yellowing | no | no |

EFFECTS OF THE INVENTION

OP/RTC silicone elastomer compositions according to the present invention have the following characteristic features because they are prepared by mixing specific quantities of each of components (A) and (B) and thereafter blending in component (C): absence of precure slump, provision of an appropriate working time, absence of cracking during the course of curing even under deformation by external forces, and no yellowing during storage or after curing even when challenged by thermal episodes.

That which is claimed is:

1. A method for the preparation of room-temperature-curable silicone elastomer compositions comprising mixing
(A) 0.5 to 75 parts by weight of the reaction mixture of (a) and (b) or composition (b) prepared from
  (a) 0 to 55 parts by weight hydroxyl-terminated diorganopolysiloxane with a viscosity at 25° C. of 0.5 to 300 Pa.s and
  (b) an alkyl-containing oximosilane with the formula $R^1Si(OX)_3$ in which $R^1$ represents an alkyl group and X is an organic group of the formula $-N=CR^2R^3$ in which each $R^2$ and $R^3$ represents a monovalent hydrocarbon groups having no more than 6 carbon atoms; an organic group of the formula

in which $R^4$ represents a divalent hydrocarbon group having no more than 10 carbon atoms; or a $C_1$ to $C_4$ monovalent hydrocarbon group, wherein $C_1$ to $C_4$ monovalent hydrocarbon groups make up no more than 30 mole % of X, wherein the amount of the said component (b) is within the range of 0.5 to 20 parts by weight for each 100 parts by weight of the total weight of component (a) in components (A) and (B) and the total number of moles of oximo groups in component (b) exceeds the total number of moles of hydroxyl groups in component (a) with (B) 45.5 to 120 parts by weight of the reaction mixture of
  (a) 45 to 100 parts by weight hydroxyl-terminated diorganopolysiloxane with a viscosity at 25° C. of 0.5 to 300 Pa.s, with the proviso that the total amount of component (a) used in components (A) and (B) is 100 parts by weight and
  (c) vinyl-functional oximosilane with the formula $CH_2=CHSi(OX)_3$, in which X is defined above, wherein the amount of said component (c) is within the range of 0.5 to 20 parts by weight for each 100 parts by weight of the total weight of component (a) in components (A) and (B) and the total number of moles of oximo groups in this component exceeds the total number of moles of hydroxyl groups in component (a); and by thereafter blending in (C) 1 to 200 parts by weight inorganic filler.

2. The method for the preparation of a one-package room-temperature-curable silicone elastomer composition according to claim 1, in which the inorganic filler is silica micropowder.

3. The method for the preparation of a one-package room-temperature-curable silicone elastomer composition according to claim 2, in which the silica micropowder is hydrophilic silica.

4. The method for the preparation of a one-package room-temperature-curable silicone elastomer composition according to claim 2, in which the silica micropowder is hydrophobic silica.

5. The method for the preparation of a one-package room-temperature-curable silicone elastomer composition according to claim 1, further comprising adding 0.01 to 5 parts by weight of a cure-accelerating catalyst as a component (D).

* * * * *